(12) United States Patent
Vasseur et al.

(10) Patent No.: US 7,660,254 B2
(45) Date of Patent: Feb. 9, 2010

(54) OPTIMIZATION OF DISTRIBUTED TUNNEL REROUTING IN A COMPUTER NETWORK WITH COORDINATED HEAD-END NODE PATH COMPUTATION

(75) Inventors: Jean-Philippe Vasseur, Dunstable, MA (US); Francois Le Faucheur, Valbonne (FR); Anna Charny, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 11/676,582

(22) Filed: Feb. 20, 2007

(65) Prior Publication Data

US 2008/0151756 A1    Jun. 26, 2008

Related U.S. Application Data

(60) Provisional application No. 60/871,515, filed on Dec. 22, 2006.

(51) Int. Cl.
*H04L 12/26* (2006.01)
(52) U.S. Cl. ........................ 370/237; 370/231
(58) Field of Classification Search ............... 370/229, 370/230, 230.1, 231, 232, 235, 237, 238, 370/254, 255
See application file for complete search history.

(56) References Cited

U.S. PATENT DOCUMENTS

| | | | |
|---|---|---|---|
| 6,049,524 A * | 4/2000 | Fukushima et al. | 370/220 |
| 6,122,272 A | 9/2000 | Tomaszewski et al. | |
| 6,215,763 B1 * | 4/2001 | Doshi et al. | 370/216 |
| 6,256,309 B1 | 7/2001 | Daley et al. | |
| 6,370,119 B1 | 4/2002 | Basso et al. | |
| 6,600,724 B1 | 7/2003 | Cheng | |
| 6,665,273 B1 | 12/2003 | Goguen et al. | |
| 6,717,920 B1 | 4/2004 | Cheng | |
| 6,778,492 B2 | 8/2004 | Charny et al. | |
| 6,970,464 B2 | 11/2005 | Xu et al. | |
| 6,978,394 B1 | 12/2005 | Charny et al. | |
| 7,031,262 B2 | 4/2006 | Vasseur et al. | |
| 7,054,262 B2 | 5/2006 | Gerstel | |
| 2006/0039391 A1 | 2/2006 | Vasseur et al. | |
| 2006/0104199 A1 | 5/2006 | Katukam et al. | |

OTHER PUBLICATIONS

Phipip Merlin et al, "A Failsafe Distributed Routing Protocol", Sep. 1979, IEEE Transactions on Communications, vol. COM-27, No. 9, pp. 1280-1287.*

Rene Boel et al, "Distributed Routing for Load Balancing", Jan. 1989, Proceedings of the IEEE, vol. 77, No. 1, pp. 210-221.*

(Continued)

*Primary Examiner*—Kwang B Yao
*Assistant Examiner*—Andrew Lai
(74) *Attorney, Agent, or Firm*—Cesari and McKenna LLP

(57) ABSTRACT

In one embodiment, head-end nodes receive a list of tunnels to be rerouted from a particular link of an intermediate node. If a head-end node is unable to reroute a tunnel for which it is the head-end node using conventional distributed routing, each head-end node executes the same algorithm to compute paths for all tunnels in the list (e.g., potentially applying bandwidth scaling).

20 Claims, 8 Drawing Sheets

OTHER PUBLICATIONS

U.S. Appl. No. 60/871,515, filed Dec. 22, 2006, entitled Optimization of Distributed Tunnel Rerouting in a Computer Network, by Vasseur et al., 42 pgs.

Awduche, D., Network Working Group Request for Comments 3209, entitled "RSVP-TE: Extensions to RSVP for LSP Tunnels," IETF, Dec. 2001, pp. 1-57.

Smit, H., Network Working Group Request for Comments 3784, entitled "Intermediate-System-to-Intermediate-System (IS-IS) Extensions for Traffic Engineering (TE)," IETF, Jun. 2004, pp. 1-13.

Katz, D. at al, Network Working Group Request for Comments 3630, entitled "Traffic Engineering (TE) Extensions to OSPF Version 2," IETF, Sep. 2003, pp. 1-14.

Braden, R. at al., Network Working Group Request for Comments 2205, entitled "Resource ReSerVation Protocol (RSVP), Version 1 Functional Specification," IETF, Sep. 1997, pp. 1-105.

Berger, L., Network Working Group Request for Comments 3473, entitled "Generalized Multi-Protocol Label Switching (GMPLS) Signaling Resource ReserVation Protocol- Traffic Engineering (RSVP-TE) Extensions," IETF, Jan. 2003, pp. 1-40.

* cited by examiner

OPTIMIZATION OF DISTRIBUTED TUNNEL REROUTING IN A COMPUTER NETWORK WITH COORDINATED HEAD-END NODE PATH COMPUTATION

CROSS-REFERENCE TO RELATED APPLICATION

The present application claims the benefit of U.S. Provisional Patent Application Ser. No. 60/871,515, which was filed on Dec. 22, 2006, by Vasseur et al. for OPTIMIZATION OF DISTRIBUTED TUNNEL REROUTING IN A COMPUTER NETWORK and is hereby incorporated by reference.

TECHNICAL FIELD

The present disclosure relates generally to computer networks, and, more particularly, to rerouting of tunnels within computer networks.

BACKGROUND

Path computation for tunnels of a computer network, e.g., label switched paths (LSPs), is often performed in a distributed manner, where each head-end node of the tunnels computes paths for its tunnels independently from head-end nodes of other tunnels. For example, tunnels in many Multi-Protocol Label Switching (MPLS) Traffic Engineering (TE) networks (e.g., MPLS TE-LSPs) are computed using a distributed constrained shortest path first (CSPF) algorithm. As those skilled in the art will understand, distributed CSPF offers high flexibility/scalability, and is well-equipped to handle frequent topology changes, dynamic traffic demands, and resource availability changes.

One problem associated with distributed path computation is that while it may be highly flexible/scalable, it may be inefficient for optimizing tunnel placement within the network, i.e., due to the lack of path computation coordination among the head-end nodes. In particular, when one or more established tunnels utilize a link that becomes unavailable to those tunnels (e.g., due to failure of the link or preemption of certain tunnels on the link for a higher priority tunnel), each of the head-end nodes corresponding to the affected tunnels generally attempts to reroute the tunnels through the network. The distributed rerouting of the tunnels may cause a burst of signaling within the network to reroute the tunnels, as will be understood by those skilled in the art. Also, "preemption cascading," where one tunnel is rerouted and then preempts shortly thereafter a lower priority tunnel, which then preempts a still lower priority tunnel, etc., may occur with distributed rerouting of tunnels. In addition, if many smaller tunnels are rerouted throughout the network, those smaller tunnels may "fragment" the remaining bandwidth of the network, to the extent that even if a large amount of bandwidth is available from a source to a destination, that bandwidth may be fragmented into smaller amounts along multiple paths such that no one (acceptable) path exists upon which a large tunnel may be placed.

Further, when there is a link (or node) failure within a network, the total available bandwidth of the network is reduced. For instance, this may result in some tunnels that had been in place before the link failure not being able to find a path after the failure due to insufficient bandwidth availability of the network. For guaranteed traffic over the tunnels (e.g., voice, video, etc.), the tunnels that are able to find suitable paths may maintain the bandwidth guarantee, while other tunnels that are not able to find such paths are unable to maintain their guarantee.

Due to the distributed nature of path computation for tunnels (e.g., distributed CSPF), it has generally not been possible to coordinate the rerouting (replacement) of tunnels in a computer network such that substantially all tunnels can be placed. In other words, it has generally not been possible to coordinate the timing, placement, and bandwidth reservation (e.g., fair allocation of remaining available bandwidth across competing tunnels) of tunnels using distributed path computation, particularly in the event of a link (or node) becoming unavailable to the tunnels, e.g., due to a failure or preemption on the link.

BRIEF DESCRIPTION OF THE DRAWINGS

The above and further advantages of the invention may be better understood by referring to the, following description in conjunction with the accompanying drawings in which like reference numerals indicate identically or functionally similar elements, of which.

DESCRIPTION OF EXAMPLE EMBODIMENTS

Overview

Figure 1:
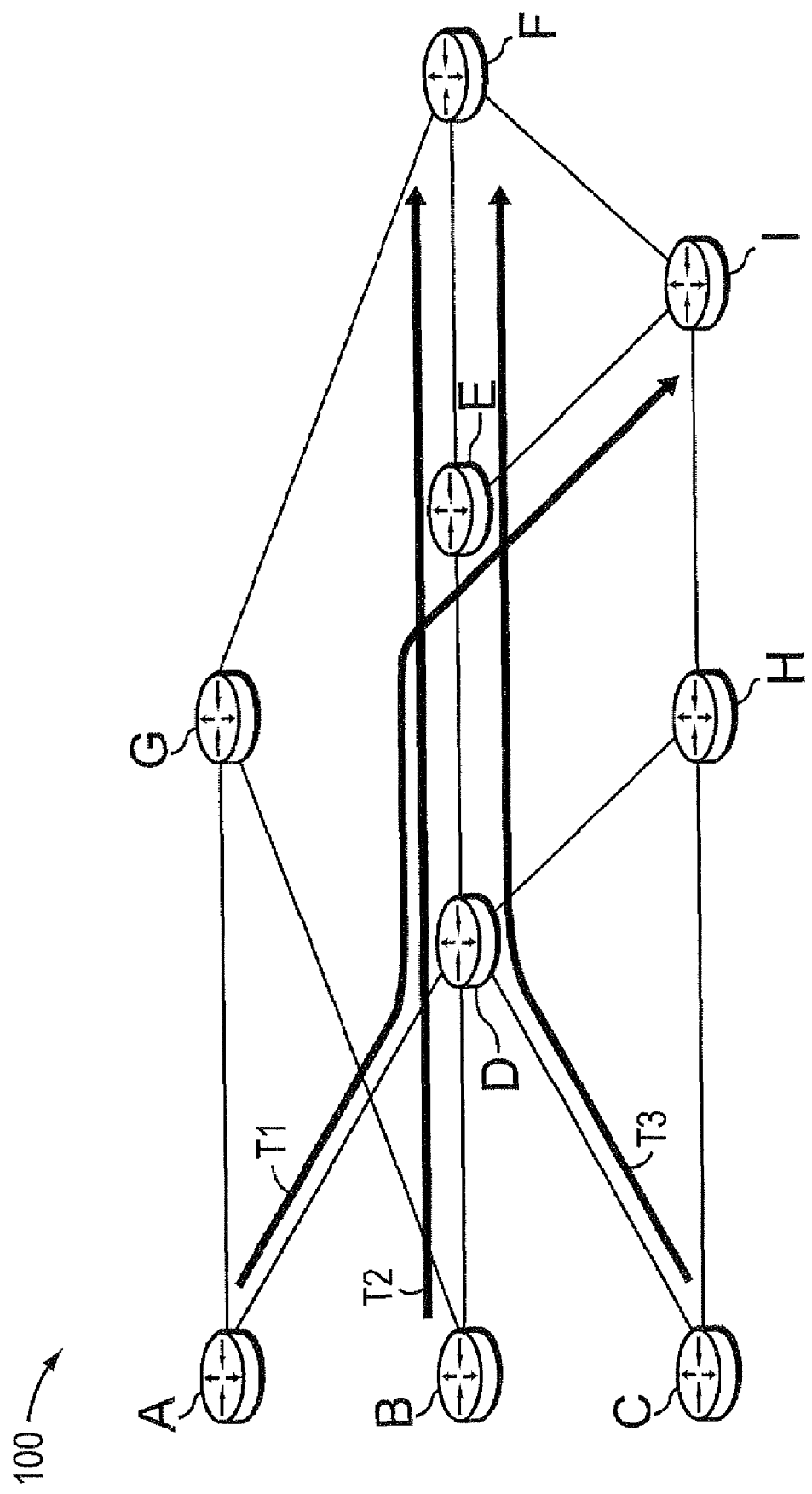
FIG. 1 illustrates an example computer network.

According to embodiments of the disclosure, one or more head-end nodes receive from an intermediate node a list of tunnels to be rerouted from a particular link of the intermediate node (e.g., should the link or node fail), each tunnel having a respective head-end node. Prior to the failure or upon occurrence of the failure, each head-end node may then determine whether it is able to reroute all of its tunnels of the list, and if not, the head-end node may inform the other head-end nodes of its inability. Upon receiving information that one or more head-end nodes are unable to reroute one or more tunnels of the list, each head-end node executes the same algorithm to compute paths for all tunnels in the list (e.g., by optionally applying a bandwidth scaling factor). Each head-end node then reroutes its tunnels of the list based on the computed paths for all the tunnels in the list (which are the same regardless of which head-end node computed the path).

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an example computer network 100 illustratively comprising nodes (e.g., routers) A-I interconnected by links as shown. Illustratively, various tunnels (not shown) may traverse the links between head-end nodes (e.g., nodes A-C) and tail-end nodes (e.g., nodes F and I), such as through one or more intermediate nodes (e.g., at least nodes D, E, G, and H), as described herein and as will be understood by those skilled in the art. Those skilled in the art will also understand that any number of nodes, routers, links (e.g., with any bandwidth values), etc. may be used in the computer network, and that the view shown herein is for simplicity. Further, those skilled in the art will also understand that while the present invention is described generally, it may apply to customer networks and provider core networks with provider (P) and provider edge (PE) routers, any network configuration within an AS or area/level, or throughout multiple ASes or areas/levels, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
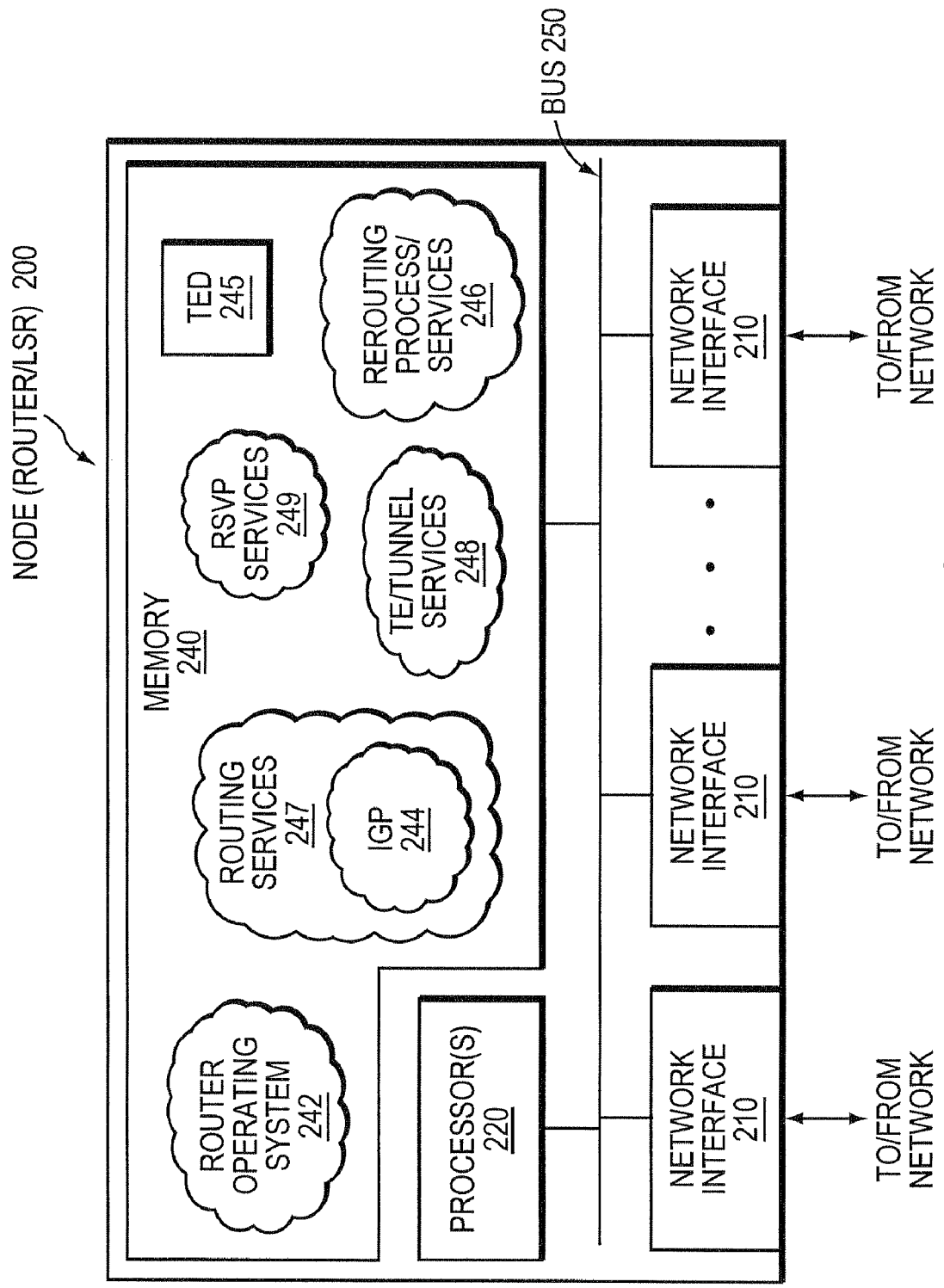
FIG. 2 illustrates an example network device/node.

FIG. 2 is a schematic block diagram of an example node/router 200 that may be advantageously used with one or more embodiments described herein, e.g., as a head-end node or intermediate node (label switched routers, "LSRs"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, such as Traffic Engineering Database (TED) 245. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Interior Gateway Protocol (IGP) services 244, Resource ReSerVation Protocol (RSVP) services 249, Traffic Engineering (TE)/Tunnel services 248, and as described herein, an example rerouting process/service 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., Open Shortest Path First, "OSPF," and Intermediate-System-to-Intermediate-System, "IS-IS") as IGP services 244, the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services 244, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
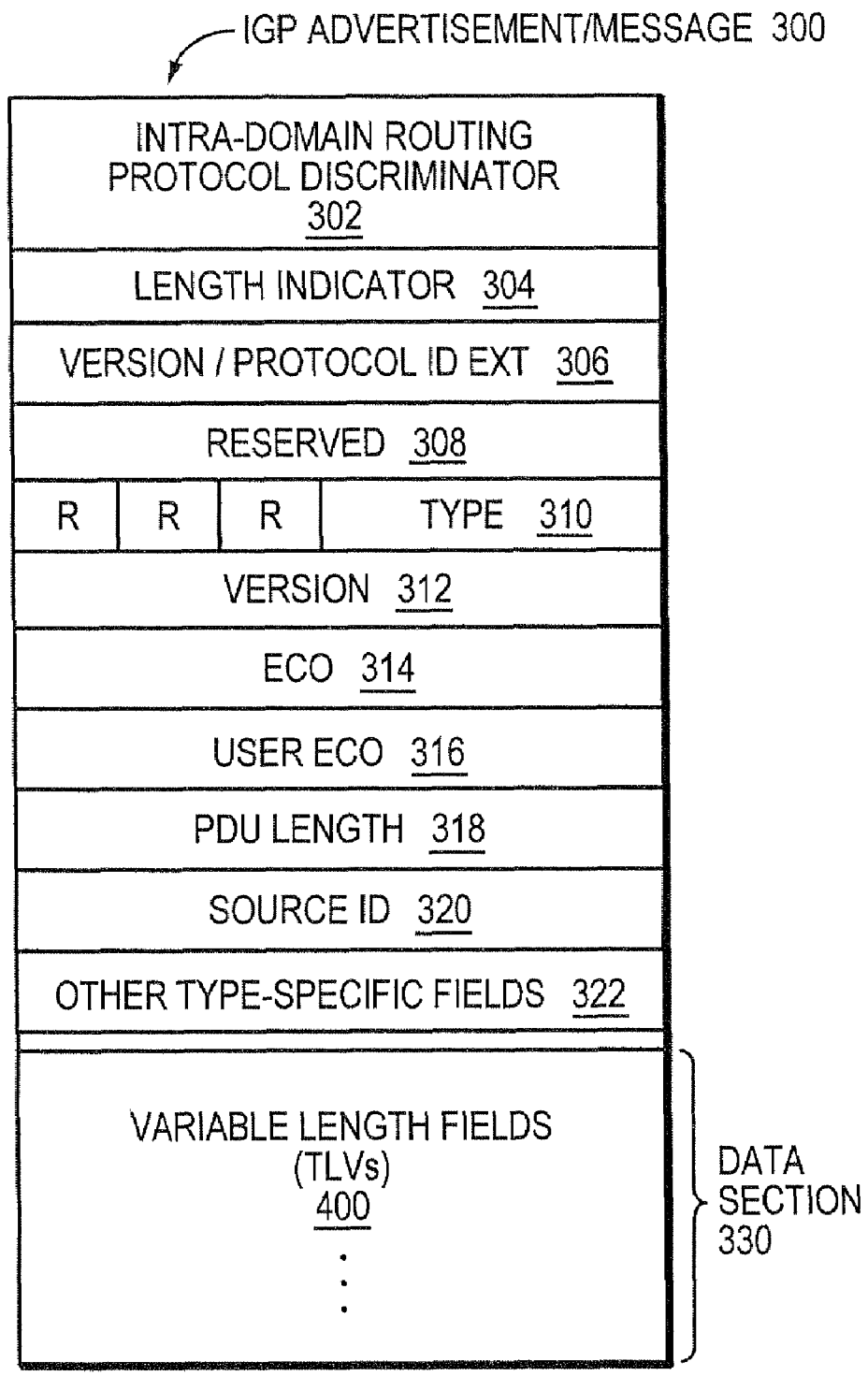
FIG. 3 illustrates an example IGP message.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel fields (e.g., sub-TLVs in a Router Capability TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
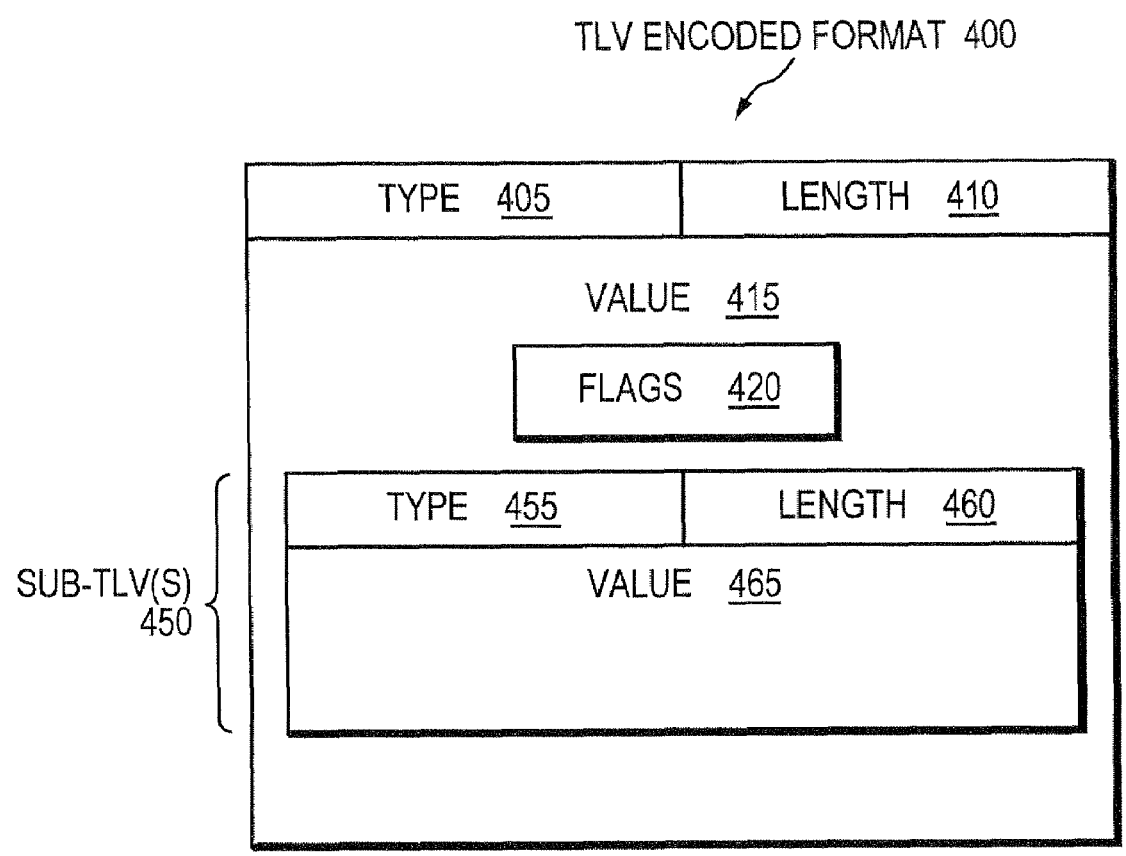
FIG. 4 illustrates an example TLV format.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. TED 245 may be illustratively resident in memory 240 and used to store TE information provided by the routing protocols, such as IGP, BGP, and/or RSVP (e.g., with TE extensions as described herein). The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 5:
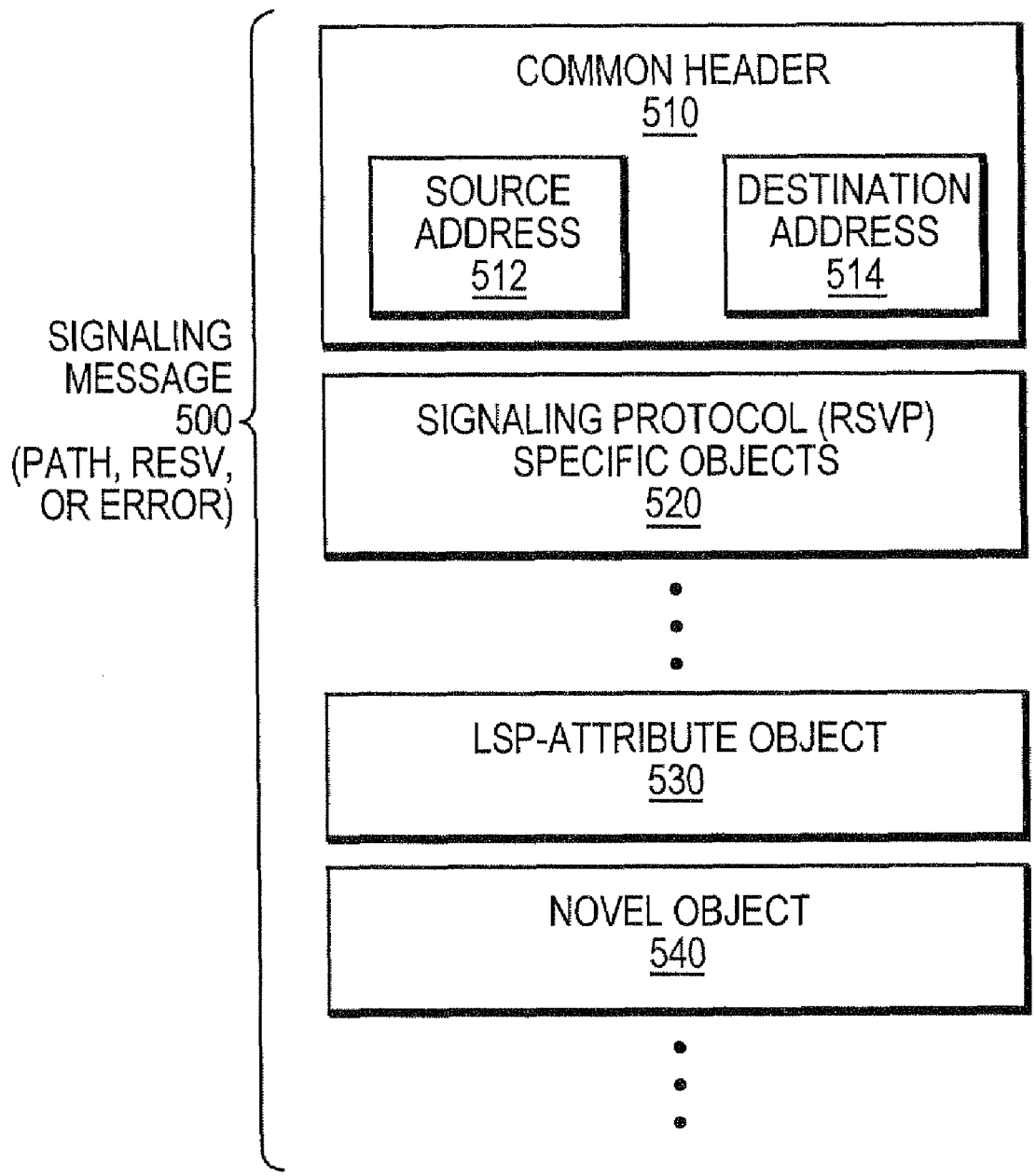
FIG. 5 illustrates an example RSVP message.

FIG. 5 is a schematic block diagram of portions of a signaling message 500 (e.g., RSVP message, such as Path, Resv or Error) that may be advantageously used with the present invention. Message 500 contains, inter alia, a common header 510, one or more signaling protocol specific objects 520, such as an LSP-Attribute object 530, as well as one or more other (e.g., novel) objects 540, described below. The common header 510 may comprise a source address 512 and destination address 514, denoting the origination and requested termination of the message 500. Protocol specific objects 520 contain objects necessary for each type of message 500 (e.g., Path, Resv, Error, etc.). For instance, a Path message may have a sender template object, Tspec object, Previous-hop object, etc. A Resv message, on the other hand, may have specific objects 520 for a label object, session object, filter spec object, etc. Also, Error messages 500 (e.g., PathErr or ResvErr), may also have specific objects 520, such as for defining the type of error, etc. Various flags and/or TLVs 400 may also be contained within the objects 520-540, as will be understood by those skilled in the art.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) contained in signaling messages for a tunnel.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

Illustratively, with reference again to FIG. 1, head-end nodes A, B, and C have established tunnels T1, T2, and T3, respectively, along paths as shown to tail-end nodes I, F, and F, also respectively. In particular, each tunnel T1-T3 traverses a particular link of network 100, e.g., the link between intermediate nodes D and E ("link D-E").

As noted, distributed CSPF may be used in a network, such that each head-end node of a tunnel computes its own tunnel paths through the network, particularly when rerouting the tunnel due to tunnel preemption and/or failure of a network element (e.g., a node or link). A problem with distributed path computation is that it may be inefficient for optimizing tunnel placement within the network. For example, it has generally not been possible to coordinate the timing, placement, and bandwidth reservation (e.g., reduced yet fair bandwidth allocation) of tunnels using distributed path computation, particularly in the event of a link (or node) becoming unavailable to the tunnels.

Optimization of Distributed Tunnel Rerouting: Head-End Nodes Coordinate Path Computation with Shared Algorithm According to embodiments of the disclosure, one or more head-end nodes receive from an intermediate node a list of tunnels to be rerouted from a particular link of the intermediate node, each tunnel having a respective head-end node. Each head-end node may then determine whether it is able to reroute all of its tunnels of the list, and if not, the head-end node may inform (e.g. via some IGP extensions) the other head-end nodes of its inability. Upon receiving information that one or more head-end nodes are unable to reroute one or more tunnels of the list, each head-end node executes the same (shared) algorithm to compute paths for all tunnels in the list (e.g., possibly by applying a bandwidth scaling factor if needed). Each head-end node then reroutes its tunnels of the list based on the computed paths for all the tunnels in the list (which are the same regardless of which head-end node computed the path).

In an illustrative embodiment, rerouting process/services 246 contain computer executable instructions executed by each processor 220 to perform functions relating to the novel techniques described herein to optimize distributed rerouting of tunnels in a computer network.

Figure 6A:
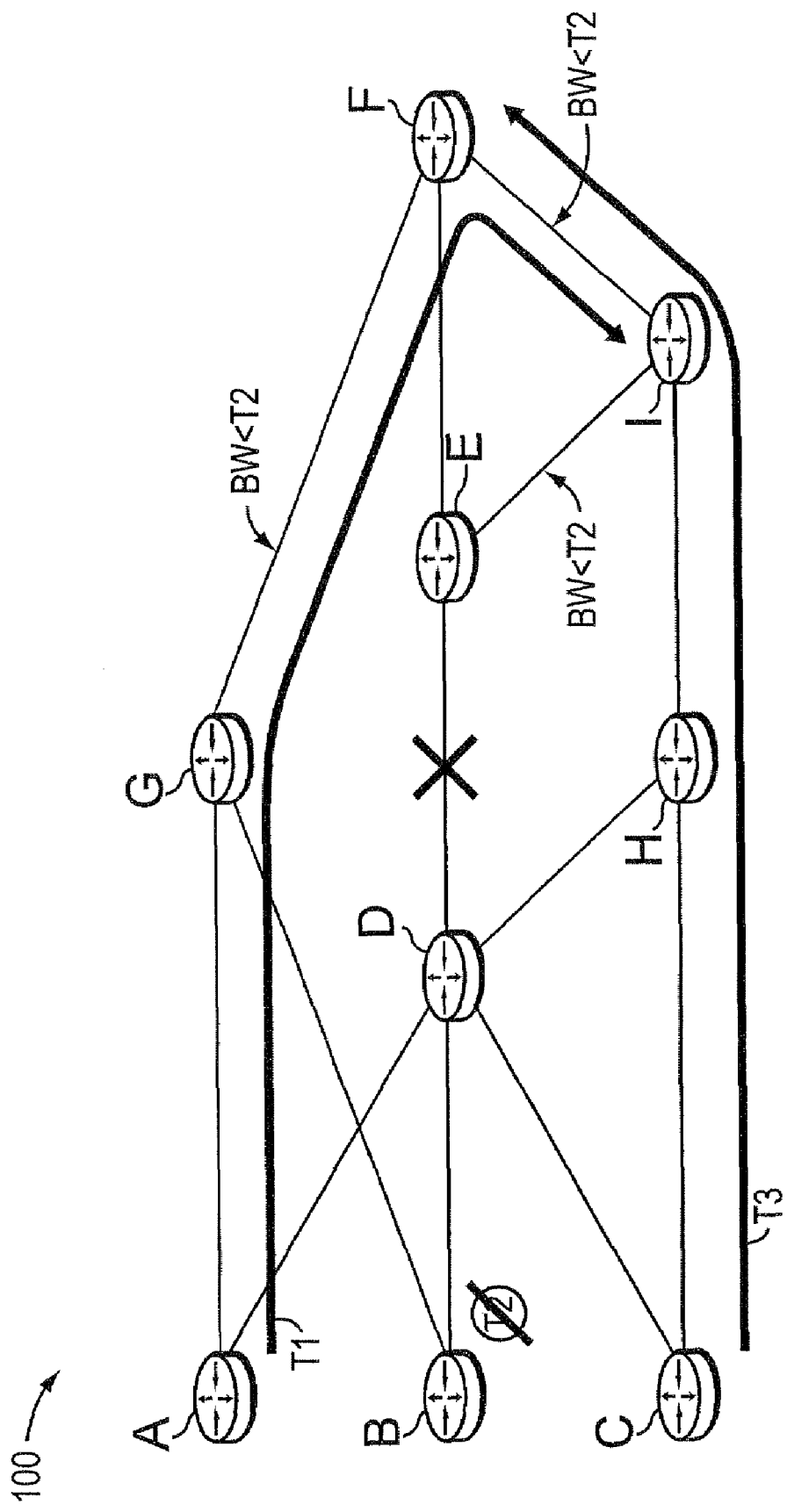
FIGS. 6A-B illustrate an example computer network with optimized distributed tunnel rerouting in accordance with one or more embodiments described herein.

Operationally, an intermediate node may detect a failure of one of its links, and thus sends an error message (e.g., PathErr 500, IGP update 300, etc.) to notify the headend nodes corresponding to the affected tunnels of that particular link of the failure. For example, with reference to FIG. 6A, intermediate node D may determine that its link D-E has failed (shown as the overlaid "X"). The intermediate node also determines a subset (from zero to all) of the tunnels for which the head-end nodes is to reroute according to the algorithm described herein. For example, the intermediate node may select the tunnels corresponding to the largest tunnels in the network, e.g., up to a certain amount of total bandwidth (e.g., 80%), etc. That is, the intermediate node may select X % of tunnels such that the sum of their bandwidths is greater than or equal to Y % of total bandwidth of the tunnels, etc. Notably, for an optimal solution to replace all tunnels, it may be beneficial to configure the subset to be all of the tunnels. However, because certain networks may be configured with many tunnels, it may hinder performance to attempt to reroute a large number of tunnels according to the algorithm described herein.

Illustratively, the intermediate node sends an IGP update message 300 having a new TLV 400, e.g., an "AFFECTED-TUNNEL" TLV (e.g., carried in an OSPF Router Information LSA or IS-IS Router Capability TLV, etc.) to reach the affected tunnel headend nodes. Alternatively, the intermediate node may include the TLV 400 within an RSVP PathErr message 500 sent directly toward each head-end node. Within the AFFECTED-TUNNEL TLV, the intermediate node may include the determined subset of tunnels affected by the failed link, e.g., in a list or table where each entry refers to a failed tunnel and a corresponding head-end node (e.g., and tail-end node), as well as certain attributes of the tunnels. In particular, any constraints relevant to path computation (e.g., source/destination, bandwidth, priority, etc.) may be included. For example, link D-E originally carried traffic for tunnels T1, T2 and T3, so the message (300 or 500) sent to the corresponding head-end nodes A, B and C may contain the relevant information for T1, T2 and T3. (Conventional mechanisms to retrieve the tunnel path may be used by the intermediate node, such as RRO objects, etc.)

Upon receiving the IGP message 300 with the AFFECTED-TUNNEL TLV, rerouting process/services 246 of each head-end node having an affected tunnel (e.g., nodes A, B, and C) stores a copy of the current TED 245 (e.g., immediately following the failure of the link), referred to as "TED(0)." (Notably, a new TED need not be stored, but pointers may be used to keep track of any subsequent changes.) The head-end nodes may also start a configurable timer, a "watch-failure" timer, at this time.

The rerouting process 246 of each head-end node attempts to place all of the affected tunnels for which it is the head-end node using conventional path computation, e.g., distributed CSPF (or other path computation techniques so configured).

If the head-end node is able to replace (reroute) all of its tunnels, it does so, and waits for the expiration of the watch-failure timer. For example, head-end nodes A and C may determine that paths may be found (as shown) for their respective tunnels T1 and T3 that circumvent the failed link D-E. If, on the other hand, a head-end node is unable to find a path (unable to place) one or more of its tunnels using the current (e.g. conventional) path computation algorithm (e.g., node B for tunnel T2, where remaining links to its tail-end node F have bandwidth "BW" less than what is needed for T2), the rerouting process 246 of the head-end node is configured to notify/inform the other head-end nodes having affected tunnels. For example, the head-end node unable to place one or more of its tunnels (node B) may notify the other head-end nodes (nodes A and C) by sending an IGP update message 300 with a new TLV 400 called "NO-PATH" (e.g., carried in an OSPF Router Information LSA or IS-IS Router Capability TLV). In a simple form, the NO-PATH TLV 400 may just include a flag/indication that may be interpreted as a failure to place at least one tunnel. Alternatively, the notification may also contain other information, such as, e.g., a total amount of bandwidth that cannot be placed/rerouted, the number of tunnels, etc. In particular, this additional information may be used by the other head-end nodes to determine whether the coordinated path computation is "worthwhile." For example, if 95% of all tunnels have been successfully rerouted, or if 99% of the bandwidth has been rerouted (e.g., if T2 is a substantially smaller tunnel), etc., it may be determined by all of the head-end nodes to not be worth the effort to re-place all the tunnels.

Upon expiration of the watch-failure timer, if no notifications were received from a head-end node unable to place a tunnel, then the tunnels were all placed (rerouted) successfully, the copy of TED(0) may be cleared, and the process is complete. However, if some tunnels were not rerouted successfully, and at least one notification is received (that is worthwhile, as mentioned above), then rerouting process 246 of each of the affected head-end nodes A-C performs a coordinated (yet distributed) path computation (e.g., a "global" computation that is the same across all head-end nodes) for all of the affected tunnels of the list (T1, T2, and T3) (that is, using generally a different path computation algorithm than the one initially used). Notably, the head-end nodes may be configured to perform the coordinated path computation prior to expiration of the watch-failure timer, such that the paths may be pre-computed to save time.

Figure 6B:
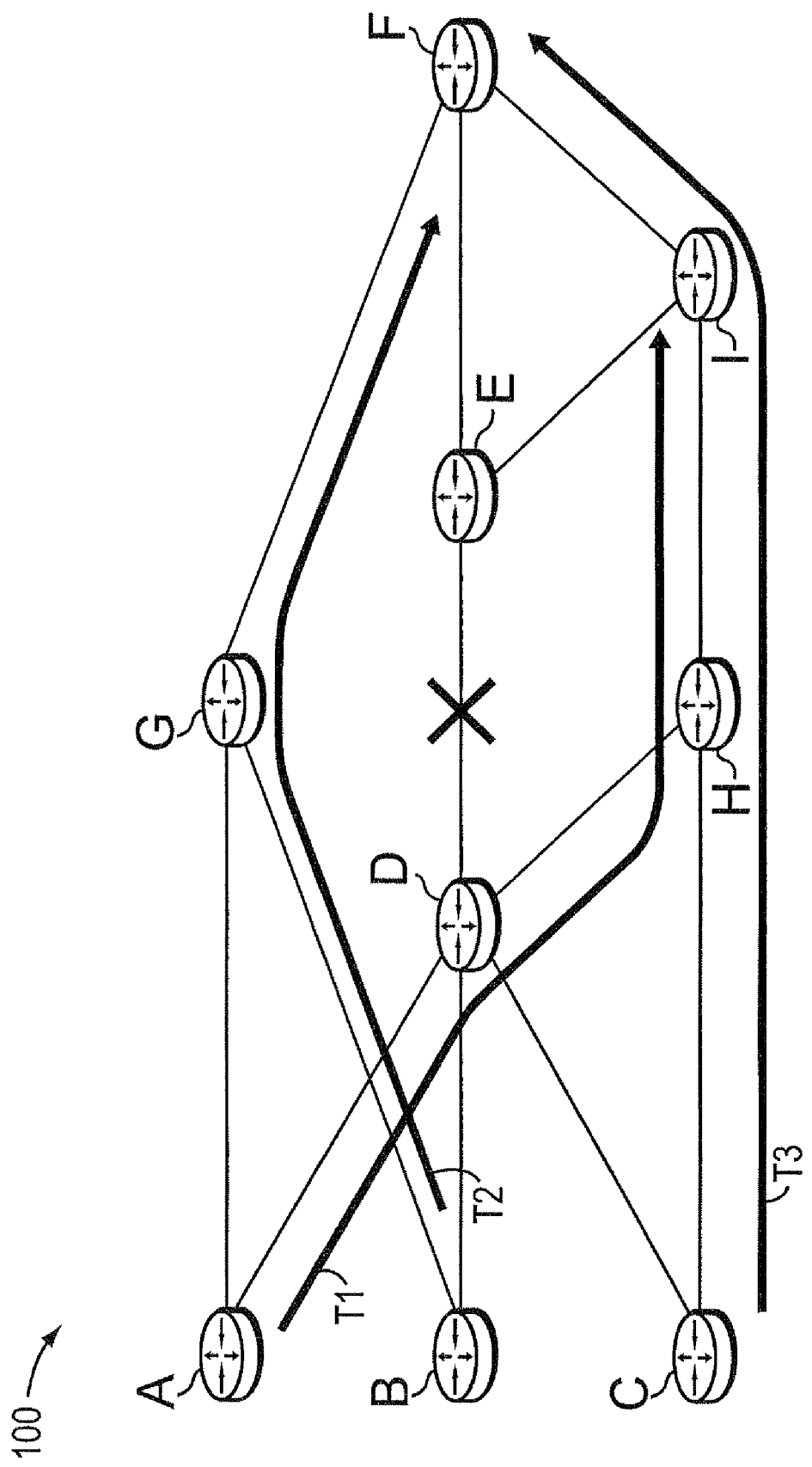

A goal of the coordinated path computation is a reoptimization of the affected tunnel paths such that each of the affected tunnels has an acceptable path through the network. For instance, based on TED(0), i.e., before possible establishment of rerouted tunnels that could find a suitable path (e.g., prior to rerouting of T1 and T3 as in FIG. 6A), each head-end node computes a path for all of the affected tunnels of the list. Notably, the rerouting process 246 of each head-end node utilizes the same computation algorithm to ensure that all head-end nodes compute the same path for each of the affected tunnels. In this manner, each head-end node can be assured that it can establish its own tunnels, since all other head-end nodes have performed the same computation and will place their tunnels where expected. Illustratively, FIG. 6B shows an example path computation result that may be computed by any of the head-end nodes A, B, and C since each uses the same algorithm. Notably, by relocating (rerouting) tunnel T1 from its original rerouted path (FIG. 6A), tunnel T2 may now have a suitable path to its tail-end node.

By having each of the affected head-end nodes compute a path for all of the affected tunnels, the computation may be configured to be fair to all affected tunnels, and to obviate a race condition to obtain network resources. For instance, various computation techniques may be used to attempt to find a solution that has an optimized average cost of all tunnels through the network, and/or a solution having minimum bandwidth scaling (i.e., where no bandwidth scaling implies that all affected tunnels may be placed at their desired bandwidths), etc. While a variety of computation techniques/algorithms may be available to the head-end nodes (e.g., some using a global scaling factor, some allowing different scaling factors for different tunnels, such as where certain nodes are more "important", etc.) it is important to note that different head-end nodes should be configured in the same manner (using the same algorithms).

As examples, the scaling may be applied equally to all tunnels that require scaling (e.g., 1% reduction of all tunnel bandwidths), or may be configured based on the tunnel sizes, e.g., 5% for tunnels above 10 Mbps, 1% for tunnels above 20 Mbps, and/or priorities of the tunnels, e.g., 1% for tunnels with priority "0", 5% for tunnels with priority "1", etc. For example, it may be necessary to scale tunnels T1 and T3 to share the link H-I, e.g., by 5% each. Note that if one scaling factor does not produce acceptable paths for all (or a sufficient subset of) tunnels of the subset/list, a greater reducing scaling factor is to be applied, e.g., increasing by a certain amount (e.g., gradually until a solution is found), or to a greater tier of configuration (e.g., changing the scaling factors in a non-linear manner, e.g., maintaining 5% for tunnels over 10 Mbps, but increasing for tunnels over 20 Mbps to 5% as well).

One technique that may be used to find an optimized solution is to use an optimization algorithm that would, for instance, minimize the global scaling factor of all tunnels. A Mixed Integer Linear Programming is an example of a technique that could be used to achieve such optimal solution, as will be understood by those skilled in the art. Other optimization criteria and other methods of finding solutions are available as will also be understood by those skilled in the art, such as less processing-intensive methods, e.g., where many tunnels are to be replaced. Again, regardless of what path computation algorithm is used to reoptimize the placement of the affected tunnels, substantially all affected head-end nodes use the same algorithm.

Once the paths are computed (and possible scaling factor determined), and once the watch failure timer expires, the rerouting process 246 of each head-end node resizes its currently established tunnels (if any) to zero bandwidth to prevent a bandwidth blocking situation (e.g., where tunnels cannot be placed because another tunnel has yet to remove its old reservation). The head-end nodes may also start a "zero-out" timer in order to allow all head-end nodes a chance to signal their tunnels with zero bandwidth. Once the zero-out timer expires, the rerouting process of each head-end node reestablishes each of its affected tunnels along the computed path, with the corresponding bandwidth as computed (e.g., possibly scaled down), and clears the stored TED(0).

Notably, regardless of which head-end node computes the path, the path is the same for a particular affected tunnel, since the rerouting process of each head-end node utilizes the same computation algorithm. In this manner, the coordinated (yet distributed) path computation technique may either find a common placement order that allows all affected tunnels to be rerouted, and/or may find a scaling factor for all tunnels that allows all of the tunnels to be rerouted successfully (e.g., fairly scaled).

Moreover, so long as no unrelated changes occur (e.g., other network failures, network changes, newly established tunnels, etc.), then the placement of the rerouted tunnels as computed by all of the head-end nodes is likely to be successful. In the event, however, that placement of a tunnel on a computed path is unsuccessful, the head-end nodes may be configured to handle the failure in a number of ways. For example, the failed tunnel may simply be treated as a failed tunnel to be recomputed as a single tunnel, or the head-end node with the failed tunnel may notify the other head-end nodes, or another rerouting computation may be performed, etc.

Figure 7:
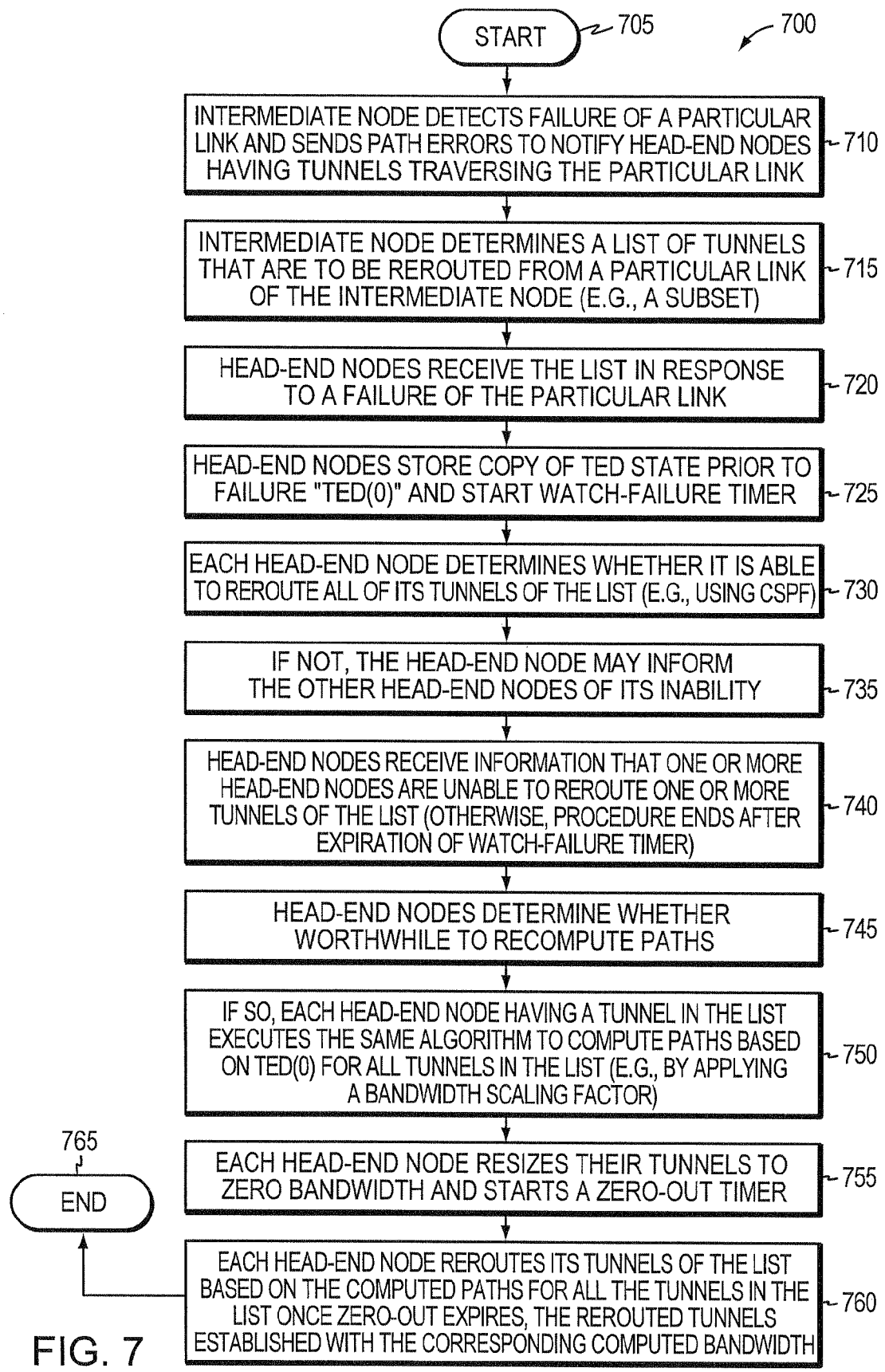
FIG. 7 illustrates an example procedure for optimized distributed tunnel rerouting in accordance with one or more embodiments described herein.

FIG. 7 illustrates an example procedure for optimizing distributed rerouting of tunnels in accordance with one or more embodiments described herein. The procedure 700 starts at step 705, and continues to step 710, where an intermediate node detects failure of a particular link and sends a path error to correspondingly notify head-end nodes having tunnels traversing the particular link of the failure. In step 715, the intermediate node determines a list of tunnels to be rerouted from a particular link of the intermediate node (e.g., a subset), as described above (e.g., before or after link failure). The rerouting process of the head-end nodes receive the list in response to a failure of the particular link in step 720, and in step 725 store a copy of the TED state prior to failure "TED(0)" and start a watch-failure timer.

In step 730, the rerouting process of each head-end node determines whether it is able to reroute all of its tunnels of the list (e.g., using CSPF), and if not, informs the other head-end nodes of its inability in step 735. In step 740, the rerouting processes of the head-end nodes receive information that one or more head-end nodes are unable to reroute one or more tunnels of the list (otherwise, procedure ends after expiration of watch-failure timer in step 765). Optionally, in step 745, the head-end nodes may determine whether it is worthwhile to recompute the paths, as described above. If it is worthwhile (or always if that option is not utilized), the rerouting process of each head-end node having a tunnel in the list executes the same algorithm to compute paths based on TED(0) for all tunnels in the list (e.g., applying a bandwidth scaling factor) in step 750, as also described above. In step 755, the rerouting process of each head-end node resizes its tunnel(s) to zero bandwidth and starts a zero-out timer. Once the zero-out timer expires, the rerouting process of each head-end node reroutes its tunnels of the list based on the computed paths for all the tunnels in the list in step 760, where the rerouted tunnels are established with the corresponding computed bandwidths (and/or at a computed time, etc.) The procedure 700 then ends in step 765. Further details, modifications, and/or options for procedure 700 are described above.

Advantageously, the novel techniques described herein optimize distributed rerouting of tunnels in a computer network. By having head-end nodes coordinate path computation with a same algorithm, the novel techniques allow affected head-end nodes to locate a path for each of its rerouted tunnels. In particular, the techniques described above allow for distributed path computation that considers each of the affected tunnels, such that the rerouted tunnels are all allowed to reserve a certain amount of bandwidth (although not necessarily their full desired bandwidths), e.g., a fair amount, thus not blocking some tunnels while allowing other tunnels to have their full bandwidths. Also, the dynamic aspects of one or more embodiments described herein alleviate the need for cumbersome and inefficient manual configuration.

While there have been shown and described illustrative embodiments that optimize distributed rerouting of tunnels in a computer network, it is to be understood that various other adaptations and modifications may be made within the spirit and scope of the present invention. For example, the embodiments have been shown and described herein relating to various protocol messages and fields, e.g., IGP and/or RSVP and related fields, etc. However, the embodiments of the invention in their broader sense are not so limited, and may, in fact, be used with other messaging/notification protocols or other fields, such as proprietary or application specific protocols, or other fields (e.g., TLVs) within the messages described herein, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving, at one or more head-end nodes, a list of tunnels to be rerouted from a particular link of an intermediate node, each tunnel having a respective head-end node of the one or more head-end nodes;
   determining, at each of the one or more head-end nodes, whether the head-end node is able to reroute all the tunnels of the list for which it is the head-end node;
   if not, informing the one or more head-end nodes of the inability;
   receiving information that one or more head-end nodes are unable to reroute one or more tunnels of the list;
   in response, executing a same algorithm at each of the one or more head-end nodes to compute paths for all tunnels in the list; and
   rerouting tunnels of the list from each head-end node based on the computed paths for all the tunnels in the list.

2. The method as in claim 1, wherein the list of tunnels to be rerouted is a subset of all the tunnels that traversed the particular link.

3. The method as in claim 1, further comprising:
   receiving, with the list of tunnels, a list of corresponding head-end nodes and tail-end nodes, and corresponding constraints relevant to path computation.

4. The method as in claim 1, further comprising:
   rerouting tunnels for which one or more of the head-end nodes are able to reroute prior to receiving the information that one or more head-end nodes are unable to reroute one or more tunnels of the list.

5. The method as in claim 4, wherein the step of rerouting tunnels of the list from each head-end node based on the computed paths for all the tunnels in the list further comprises:
   re-rerouting tunnels rerouted prior to receiving the information that one or more head-end nodes are unable to reroute one or more tunnels of the list.

6. The method as in claim 4, further comprising:
   determining that the paths for the tunnels in the list and corresponding bandwidths have been computed;
   in response, resizing, to zero bandwidth, tunnels rerouted prior to receiving the information that one or more head-end nodes are unable to reroute one or more tunnels of the list;
   starting a timer; and
   rerouting the tunnels along the computed paths and with the corresponding bandwidth as computed.

7. The method as in claim 1, further comprising:
   utilizing a path computation technique that attempts to find a solution that has an optimized average cost of all tunnels of the list.

8. The method as in claim 1, further comprising:
   applying a bandwidth scaling factor to compute paths for one or more tunnels in the list.

9. The method as in claim 8, further comprising:
   using a same bandwidth scaling factor for all tunnels in the list.

10. The method as in claim 8, further comprising:
    using a different bandwidth scaling factor for one or more tunnels in the list, wherein each of the head-end nodes utilizes the same corresponding different bandwidth scaling factor for the one or more tunnels of the list.

11. The method as in claim 8, further comprising:
    utilizing a path computation technique that attempts to find a solution that has minimum bandwidth scaling for the tunnels of the list.

12. The method as in claim 8, further comprising:
    determining that a first bandwidth scaling factor does not produce acceptable paths for all tunnels of the list; and, in response
    applying a second bandwidth scaling factor to compute paths for all tunnels in the list that is greater than the first scaling factor.

13. The method as in claim 1, further comprising:
    storing a copy of a current traffic engineering database (TED) in response to receiving the list of tunnels to be rerouted; and
    computing the paths for all tunnels in the list based on the stored copy of the TED.

14. The method as in claim 1, further comprising:
    informing the one or more head-end nodes of the inability along with other information selected from the group consisting of: a total amount of bandwidth that cannot be rerouted and the number of tunnels that cannot be rerouted.

15. The method as in claim 1, further comprising:
    receiving information that one or more head-end nodes are unable to reroute one or more tunnels of the list along with other information selected from the group consisting of: a total amount of bandwidth that cannot be rerouted and the number of tunnels that cannot be rerouted.

16. The method as in claim 15, further comprising:
    determining whether the execution of the algorithm to compute paths is worth-while based on the other information received.

17. A system, comprising:
    an intermediate node having a particular link; and
    one or more head-end nodes, each comprising:
    means for receiving a list of tunnels to be rerouted from the particular link of the intermediate node, each tunnel having a respective head-end node of the one or more head-end nodes;
    means for determining whether the head-end node is able to reroute all of its tunnels of the list;
    means for informing the one or more head-end nodes of an inability;

means for receiving information that one or more head-end nodes are unable to reroute one or more tunnels of the list;

means for executing a same algorithm at each of the one or more head-end nodes to compute paths for all tunnels in the list in response to receiving information that one or more head-end nodes are unable to reroute one or more tunnels of the list; and means for rerouting tunnels of the list from each head-end node based on the computed paths for all the tunnels in the list.

18. The system as in claim 17, wherein each of the one or more head-end nodes further comprises:

means for applying a bandwidth scaling factor to compute paths for all tunnels in the list.

19. A head-end node, comprising:

one or more network interfaces adapted to communicate with an intermediate node and one or more other head-end nodes;

one or more processors coupled to the network interfaces and adapted to execute one or more processes; and a memory adapted to store a rerouting process executable by each processor, the rerouting process when executed operable to: i) receive a list of tunnels to be rerouted from a particular link of the intermediate node, each tunnel having a respective head-end node of the one or more head-end nodes, ii) determine whether the head-end node is able to reroute all of its tunnels of the list, iii) inform the one or more head-end nodes of an inability, iv) receive information that one or more head-end nodes are unable to reroute one or more tunnels of the list, v) execute an algorithm that is the same at each of the one or more head-end nodes to compute paths for all tunnels in the list in response to receipt of information that one or more head-end nodes are unable to reroute one or more tunnels of the list, and vi) reroute tunnels of the list belonging to the head-end node based on the computed paths for all the tunnels in the list.

20. The node as in claim 19, wherein the rerouting process is further operable to:

apply a bandwidth scaling factor to compute paths for all tunnels in the list.

\* \* \* \* \*